US011273719B2

(12) United States Patent
Mikalsen

(10) Patent No.: US 11,273,719 B2
(45) Date of Patent: Mar. 15, 2022

(54) SYSTEM AND METHOD FOR REDUCTION OF POWER CONSUMPTION AND EMISSIONS OF MARINE VESSELS

(71) Applicant: Marine Technologies LLC, Mandeville, LA (US)

(72) Inventor: Jan Mikalsen, Covington, LA (US)

(73) Assignee: C-Innovation, LLC, Cut Off, LA (US)

( * ) Notice: Subject to any disclaimer, the term of this patent is extended or adjusted under 35 U.S.C. 154(b) by 0 days.

(21) Appl. No.: 16/820,516

(22) Filed: Mar. 16, 2020

(65) Prior Publication Data
US 2020/0406765 A1    Dec. 31, 2020

Related U.S. Application Data

(60) Provisional application No. 62/823,438, filed on Mar. 25, 2019, provisional application No. 62/818,605, filed on Mar. 14, 2019.

(51) Int. Cl.
| | |
|---|---|
| *B60L 53/12* | (2019.01) |
| *B60L 53/30* | (2019.01) |
| *B63B 35/44* | (2006.01) |
| *H02J 7/00* | (2006.01) |
| *H02J 7/02* | (2016.01) |

(52) U.S. Cl.
CPC ............. *B60L 53/12* (2019.02); *B60L 53/30* (2019.02); *B63B 35/44* (2013.01); *H02J 7/0047* (2013.01); *H02J 7/02* (2013.01); *B60L 2200/32* (2013.01)

(58) Field of Classification Search
None
See application file for complete search history.

(56) References Cited

U.S. PATENT DOCUMENTS

| | | | | |
|---|---|---|---|---|
| 7,410,395 | B2 * | 8/2008 | Kawai | B63B 35/40 440/6 |
| 9,184,587 | B2 | 11/2015 | Mizuno | |
| 9,353,725 | B2 * | 5/2016 | Hine | B63J 3/02 |

(Continued)

FOREIGN PATENT DOCUMENTS

| | | |
|---|---|---|
| CN | 203793585 U | 8/2014 |
| EP | 2 838 174 B1 | 2/2015 |

(Continued)

OTHER PUBLICATIONS

International Patent Application No. PCT/US/2020/023015, International Search Report and Written Opinion dated Jun. 18, 2020, 16 pgs.

(Continued)

*Primary Examiner* — Daniel Kessie
*Assistant Examiner* — Terrence R Willoughby
(74) *Attorney, Agent, or Firm* — Foley & Lardner LLP

(57) ABSTRACT

A marine vessel, system, and process provides for reducing or eliminating fuel consumption and emissions of marine vessels. System and method for charging an electricity storage element of an energy storage system of a floating marine vessel may include applying a power source from a marine platform to an electrical power bus of the floating vessel to charge the electricity storage element. A power generator of the marine vessel configured to supply electrical power to the power bus may be configured from an ON state to an OFF state.

10 Claims, 16 Drawing Sheets

(56) References Cited

U.S. PATENT DOCUMENTS

| | | | | |
|---|---|---|---|---|
| 2002/0182946 | A1* | 12/2002 | Tanaka | B63B 35/44 440/6 |
| 2010/0244450 | A1* | 9/2010 | Tabe | F03D 9/32 290/53 |
| 2011/0266996 | A1* | 11/2011 | Sugano | B60L 53/305 320/104 |
| 2012/0061973 | A1* | 3/2012 | Zelony | F03D 9/17 290/1 R |
| 2013/0006445 | A1* | 1/2013 | Hine | G01S 19/49 701/2 |
| 2013/0271083 | A1* | 10/2013 | Williams | H02J 9/06 320/128 |
| 2016/0114861 | A1* | 4/2016 | Janik | B66D 1/60 701/21 |
| 2017/0110883 | A1* | 4/2017 | Tabe | F03B 17/06 |
| 2018/0326857 | A1* | 11/2018 | Pohjanheimo | B60L 50/61 |
| 2020/0144853 | A1* | 5/2020 | Andersen | E21B 41/00 |

FOREIGN PATENT DOCUMENTS

| | | | | |
|---|---|---|---|---|
| JP | 5921647 | B1 | 5/2016 | |
| WO | WO-2017/102028 | A1 | 6/2017 | |
| WO | WO-2017102028 | A1 * | 6/2017 | .......... G05D 1/0206 |
| WO | WO-2018/214231 | A1 | 11/2018 | |

OTHER PUBLICATIONS

KR 10-1814624 B1 (Samsung Heavy Ind. Co., Ltd) Jan. 4, 2018; see English machine translation.

Miyazaki, M et al "Reduction of Fuel Consumption on Hybrid Marine Power Plants by Strategic Loading With Energy Storage Devices" IEEE Power and Energy Technology Systems Journal. Publication [online]. Oct. 26, 2016 [retrieved May 12, 2020]. Retrieved from the Internet: <URL: https://ieeexplore.ieee.org/stamp/stampjsp?arnumber=7707296>.

Sirehna Sirehna "Sirehna DP System / Autopilot" Youtube; Video [online]. Apr. 22, 2016 [retrieved May 15, 2020]. Retrieved from the Internet: <URL: https://www.youtube.com/watch?v=egYrG5rTbl0>; see entire video.

Warts | Lacorp "Wireless charger | Wireless charger | Wärtsilä" Youtube; Video [online]. Oct. 8, 2018 [retrieved May 14, 2020]. Retrieved from the Internet: <URL: https://www.youtube.com/watch?v=3p8y0bKvrz8>; see entire video.

* cited by examiner

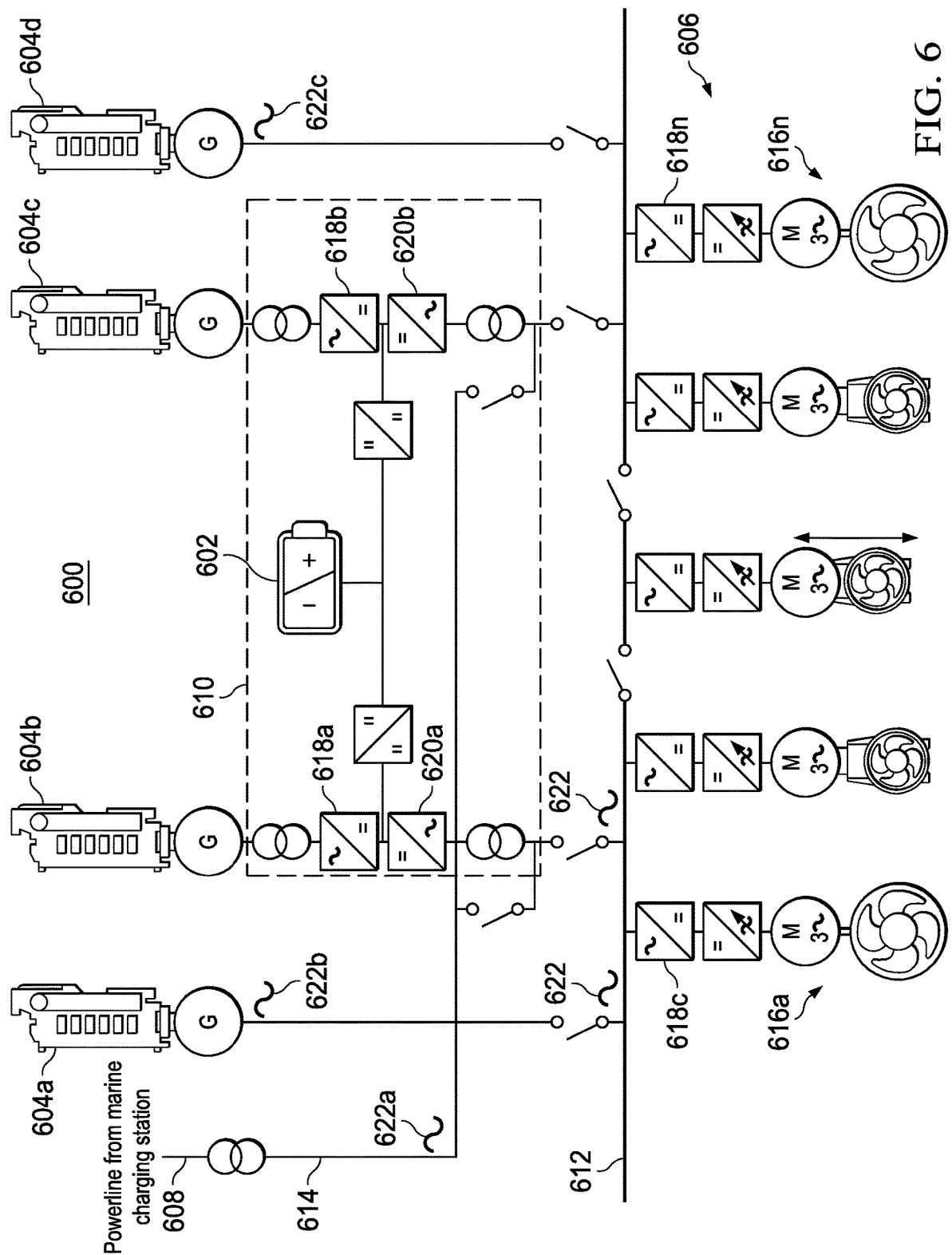

Speed Recommendation
The vessel's current speed over ground is 9.1 kn.

Change speed by -1.9kn
3.0% on NOx emissions,
This will save 76.8 gal in fuel,
and 771.6 g in CO2 emissions.

to save 6.% on fuel,
and 4.2% on CO2 emissions.
6.9 g in NOx emissions,
over 100.0 Nautical miles.

FIG. 12C

˅ Estimated Time of Arrival (ETA)
The ETA for current speed is 11.0 hour.
The ETA for optional speed is 14.0 hour.

FIG. 12D

SYSTEM AND METHOD FOR REDUCTION OF POWER CONSUMPTION AND EMISSIONS OF MARINE VESSELS

RELATED APPLICATIONS

This application claims priority to co-pending U.S. provisional patent applications 62/818,605 filed on Mar. 14, 2019 and 62/823,438 filed on Mar. 25, 2019; the contents of which are hereby incorporated by reference in their entirety.

BACKGROUND OF THE INVENTION

Managing operations of marine vessels is challenging. Marine vessels are used for a variety of functions, including cargo shipping, commercial fishing, military operations, cruising, maintaining windmills and other marine green energy systems, and many other purposes. Reducing unnecessary power usage of marine vessels is important for a number of reasons (e.g., financial and environmental), including reducing fuel consumption and reducing emissions.

Large marine vessels that use large diesel engines consume a lot of fuel per hour. The diesel fuel used by the marine vessels is expensive, and produces undesirable emissions that have recently been under scrutiny because of pollution and CO2 emissions, such as contemplated by the recent Paris Accords in which many countries agreed to reduce carbon emissions. It is therefore desirable to reduce fuel consumption and emissions by marine vessels.

There are a number of environments and uses of marine vessels in which reduction of fuel consumption is possible. In some cases, marine vessels have legacy propulsion systems such that it is extremely expensive to retrofit the marine vessels to modify those propulsion systems. Legacy marine vessels will likely be utilized for many years into the future. These marine vessels that are too expensive to modify will at some point be under scrutiny as a result of high fuel consumption and emissions, so modification in a cost effective manner for certain uses is needed.

For new marine vessels, it is possible to redesign the vessels to address fuel consumption and emissions. For such redesigns, low or no emission marine vessels that are commercially viable is needed for cost and environmental purposes.

SUMMARY OF THE INVENTION

To overcome the problem of marine vessels consuming a lot of fuel and producing emissions, a number of systems and processes may be employed both on marine vessels and in waterways to support reducing fuel consumption and emissions. Different configurations of marine vessels and/or structures operating on a waterway may be provided to reduce or eliminate fuel consumption and emissions produced by marine vessels.

One embodiment of a method for charging an electricity storage element of an energy storage system of a floating marine vessel may include applying a power source from a marine platform to an electrical power bus of the floating marine vessel to charge the electricity storage element. In an embodiment, the marine vessel is free-floating. A power generator of the marine vessel configured to supply electrical power to the power bus may be transitioned from an ON state to an OFF state. Position and heading of the marine vessel may be maintained by actuating electric thrusters of the marine vessel, where the electric thrusters may be powered by the energy storage system. In response to determining that the power source is unable to deliver sufficient power to charge the electricity storage element, the power generator may be transitioned from the OFF state to a charging state.

One embodiment of a marine charging station may include a marine platform positioned on a body of water. At least one energy generation source may be remotely located from the marine platform and electrically and/or fluidly coupled to an energy storage element positioned on the marine platform. At least one electrical power adapter may be available to be used to supply electrical power to a floating marine vessel at the marine platform to power an electricity storage element disposed thereon.

BRIEF DESCRIPTION OF THE DRAWINGS

Illustrative embodiments of the present invention are described in detail below with reference to the attached drawing figures, which are incorporated by reference herein and wherein:

FIG. 6 is a schematic diagram of an electricity storage element, power sources, and electric propulsion system of a marine vessel as being recharged by an external power source, such as a charging cable from a marine charging station;

FIGS. 12A-12D are signal diagrams and planning/recommendation operating parameters used by operators of marine vessels for minimizing energy consumption and emissions.

DETAILED DESCRIPTION OF THE INVENTION

Figure 1:
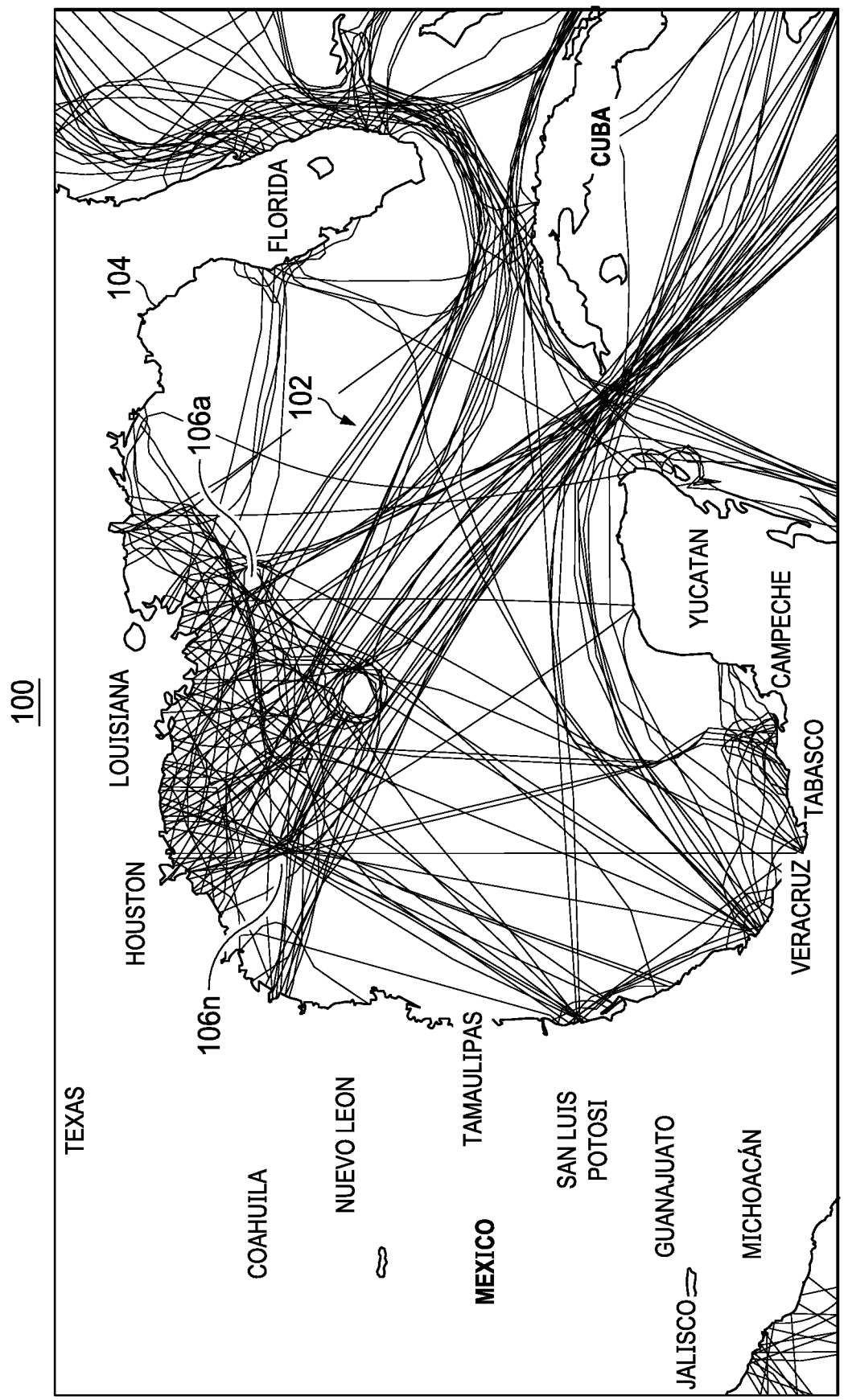
FIG. 1 is a map of an illustrative offshore marine vessel paths through a body of water that includes offshore drilling rigs.

With regard to FIG. 1, an illustrative map 100 of illustrative offshore marine vessel paths 102 along a body of water 104 that includes offshore drilling rigs 106a-106n (collectively 106) is shown. Marine vessels are used heavily for servicing the offshore drilling rigs 106 and transporting crew and resources, such as food, to the drilling rigs 106. In addition to servicing offshore drilling rigs 106, marine vessels are used to install, maintain, and otherwise service other marine platforms and operations, including wind turbines or windmills, wave energy systems, etc. that operate on the body of water 104. Moreover, there are many marine vessels that are used for transporting cargo and passengers that operate in various bodies of water. In some circumstances, those marine vessels have to be refueled or otherwise be re-charged depending on the nature of the energy source of the marine vessels. As a clean environment becomes more important on a global basis, many countries have adopted standards to reduce fuel consumption and emissions such that the historical use of diesel fuel for powering diesel engines is and will continue to transition to electric power to fuel electric propulsion systems, thereby changing the needs of the type of power and refueling processes that are required to power both existing and future marine vessels, as further described herein. With the ability to generate power using "clean" technologies, such as solar, wind, wave, geothermal, nuclear, natural gas, and/or other clean technologies, the ability to support the operation of existing and new marine vessels in a manner that is more fuel efficient or in a manner that consumes no fuel by the marine vessel is possible.

Figure 2:
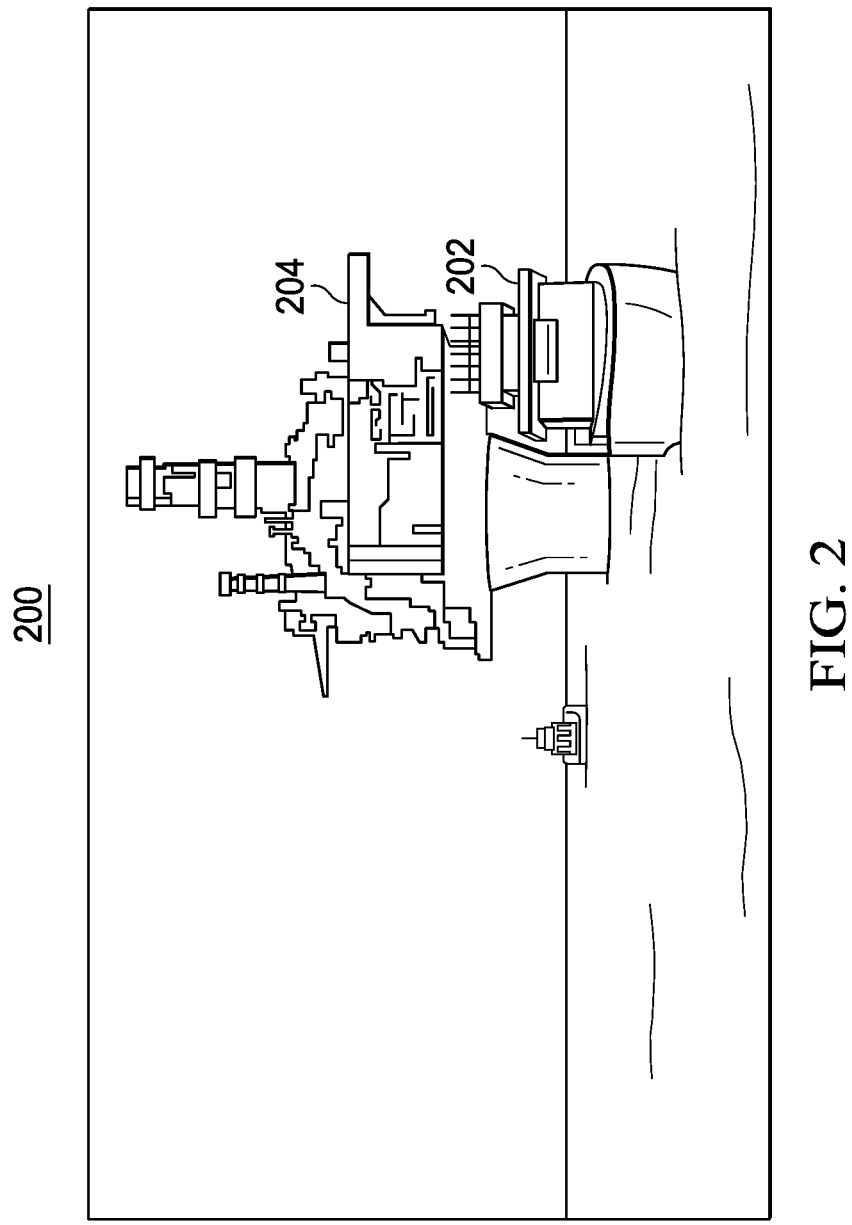
FIG. 2 is an image of an illustrative marine vessel traveling from an offshore oil drilling rig.

With regard to FIG. 2, an image of an environment 200 including an illustrative marine vessel 202 traveling from an offshore oil drilling rig 204 is shown. While at the offshore drilling rig 204, the marine vessel 202 may be "parked" or be set in a mode to remain stationary at or near the drilling rig 204, and receive electric power via a power line that may be dropped from a crane (see FIG. 3A) that supports the power line to refuel or recharge a rechargeable battery or other power source on the marine vessel 202. In an embodiment, the electricity may be created by natural gas, wind turbine, solar power, and/or otherwise that is collected by the offshore oil rig 204. In an alternative embodiment, other types of fuel (e.g., hydrogen) may be provided to the marine vessel 202 for refueling a power source (e.g., fuel cell) used to power the marine vessel 202.

Figure 3A:
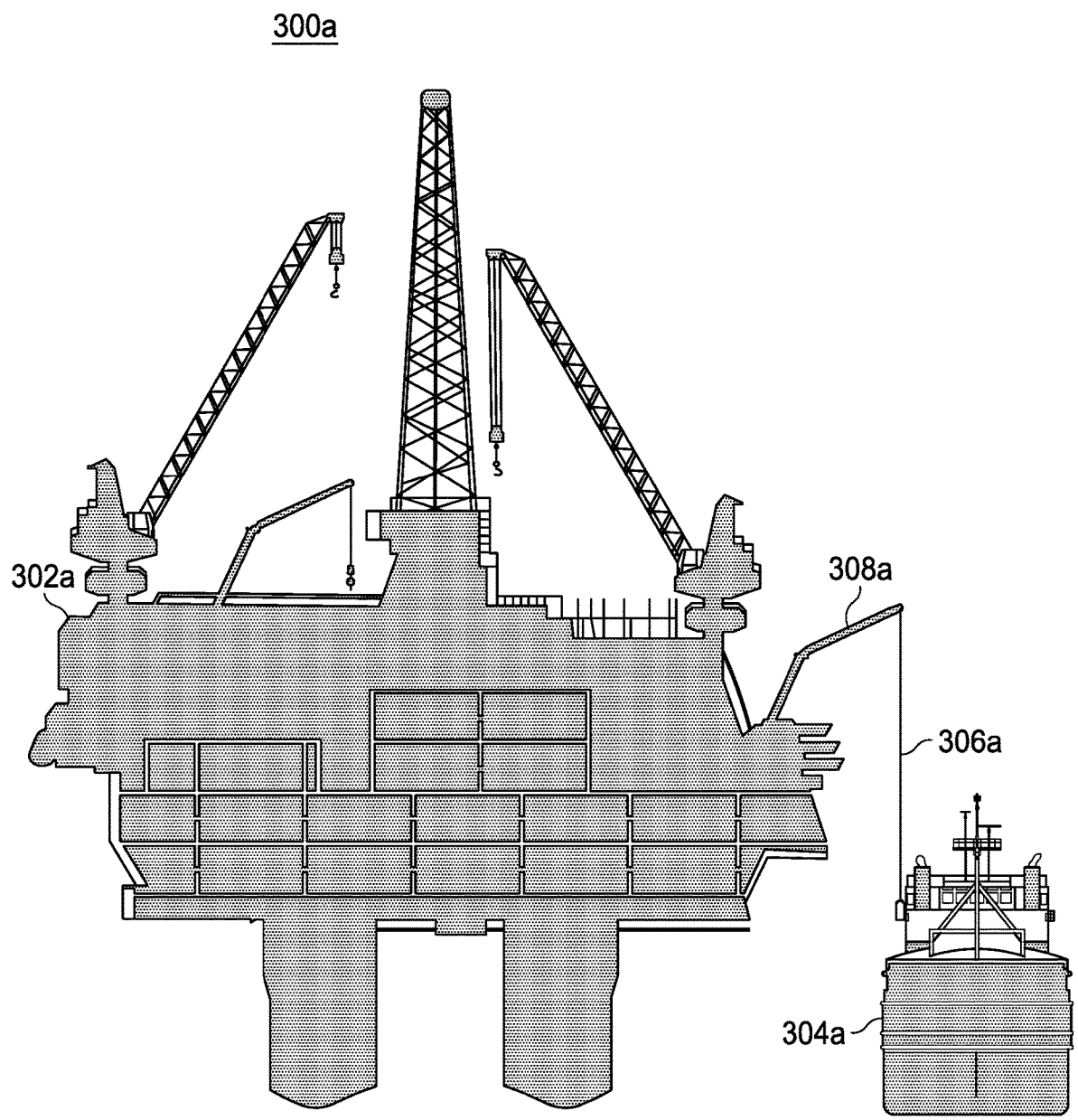
FIGS. 3A and 3B are illustrations of illustrative offshore oil rigs configured to supply marine vessels with power via a cable supported by a crane.
Figure 3B:
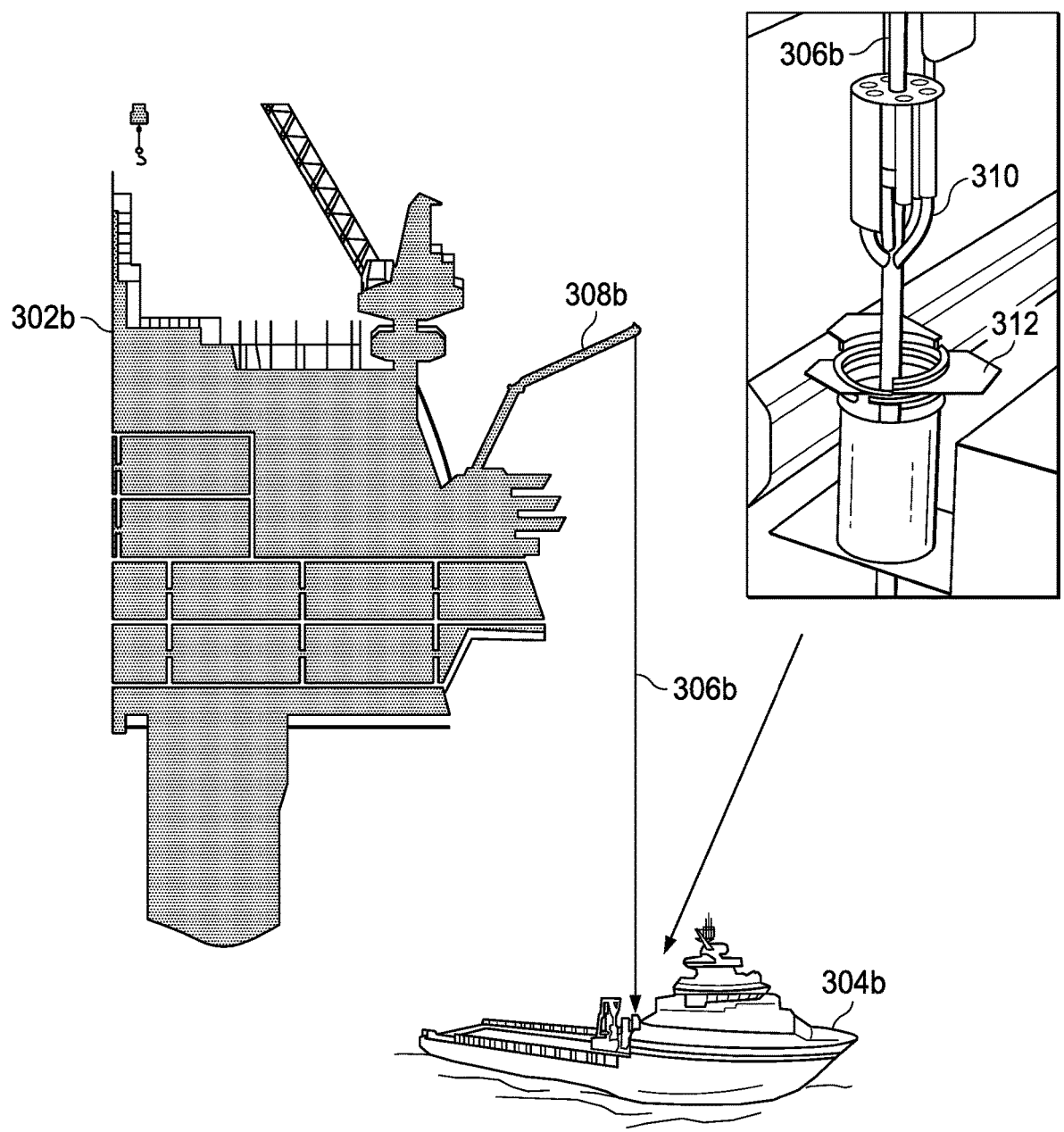

With regard to FIGS. 3A and 3B, illustrations of environments 300a and 300b (collectively 300) including illustrative offshore oil rigs 302a and 302b (collectively 302) configured to supply marine vessels 304a and 304b (collectively 304) with power via cables or power lines 306a and 306b (collectively 306) supported by respective cranes 308a and 308b (collectively 308) are shown. More specifically, the offshore drilling rigs 302 are shown to include cranes 308 that suspend and control power lines 306 to be received or released by marine vessels that are free-floating and "parked" at the offshore drilling rigs 302. It should be understood that multiple cranes and power lines may be operating on each of the offshore drilling rigs 302 to simultaneous recharge batteries or other power sources on the marine vessels 304 using multiple (e.g., 2 or 4) cranes and power lines during loading and/or unloading operations, for example. It should further be understood that the marine vessels 304 may alternatively be floating, but docketed or otherwise secured to the offshore drilling rigs 302.

As shown, the marine vessels 304 may be positioned in a stationary position, but because the marine vessels 304 are free-floating, wind, current, waves, and other environmental factors operate to cause the marine vessel to use thrusters (e.g., electric thrusters) or other propulsion mechanisms to maintain a relatively fixed position (e.g., within 5 feet, for example, from a drop point of a power line) from the offshore drilling rigs 302. In an embodiment, if the marine vessels 304 have electric thrusters to maintain the relatively fixed position at the offshore drilling rigs 302, then the marine vessels 306 may be able to turn off the diesel engine(s) so as not to consume diesel fuel, and use the electricity that is being delivered from the offshore drilling rigs 302 via the power lines 306 suspended by the cranes 308 as the main source of power while simultaneously charging a battery on the marine vessels 304.

As shown in FIG. 3B, the cable 306b may have a male connector or adapter 310 that may be inserted into a female connector or adapter 312 in transferring the electricity from the cable 306b to a power bus on the marine vessel 304b. In an embodiment, the male connector 310 and female connector 312 may be configured as quick disconnect connectors such that if the marine vessel 304b unexpectedly moves, the connectors 310 and 312 automatically release and/or separate from one another so that damage to the marine vessel 304b and/or crane does not result. It should be understood that the cranes 308 and/or cables 306 may also be configured to support or accommodate a certain amount of motion of the marine vessels 304 relative to the rigs 302. In an alternative embodiment, the connectors 310 and 312 may be inductive connectors such that electricity may be inductively transferred between the power line 306b and the power bus of the marine vessel 304b, thereby reducing the chance that damage will be caused in the event of an unanticipated movement of the marine vessel 304b relative to the offshore drilling rig 302b. It should further be understood that the male connector 310 may be female and that the female connector 312 may be male and provide the same or analogous function of transferring electrical power.

More specifically, in the case of the oil rig 302b, the power line 306b having the quick release connector 310 may be operated from the crane 308b and connected to the quick release power port 312 on the marine vessel 304b. While connected, the marine vessel 304b may be configured to be powered by electricity on the power line 306b that may be generated by natural gas or other power source produced at the oil rig 302b. The marine vessel 304b may be modified to include a battery pack that may be used to drive a power bus for powering electric thrusters of the marine vessel 304b. In an embodiment, conventional propulsion system engines may be configured and/or selected to be operated at a lower frequency, such as 50 Hz, rather than a conventional 60 Hz that is typically used to drive the power bus for powering electric thrusters and other electrical appliances connected to the power bus. Because the marine vessel 304b is free-floating at the oil rig 302b or other floating or stationary platform, the electric thrusters driven by the power bus are operating to maintain relatively fixed position and/or heading of the marine vessel 304b, which consumes power from the battery. As such, in the event that the thrusters have to be used more extensively, then the battery may have to be recharged by engaging the lower-frequency propulsion system beyond the power that is provided by the power line 306b. This process and/or configuration of the oil rig 302b and marine vessel 304b may be used to reduce power consumption of the vessel 304b, which reduces the amount of fuel usage and emissions produced by the marine vessel 304b.

Figure 4:
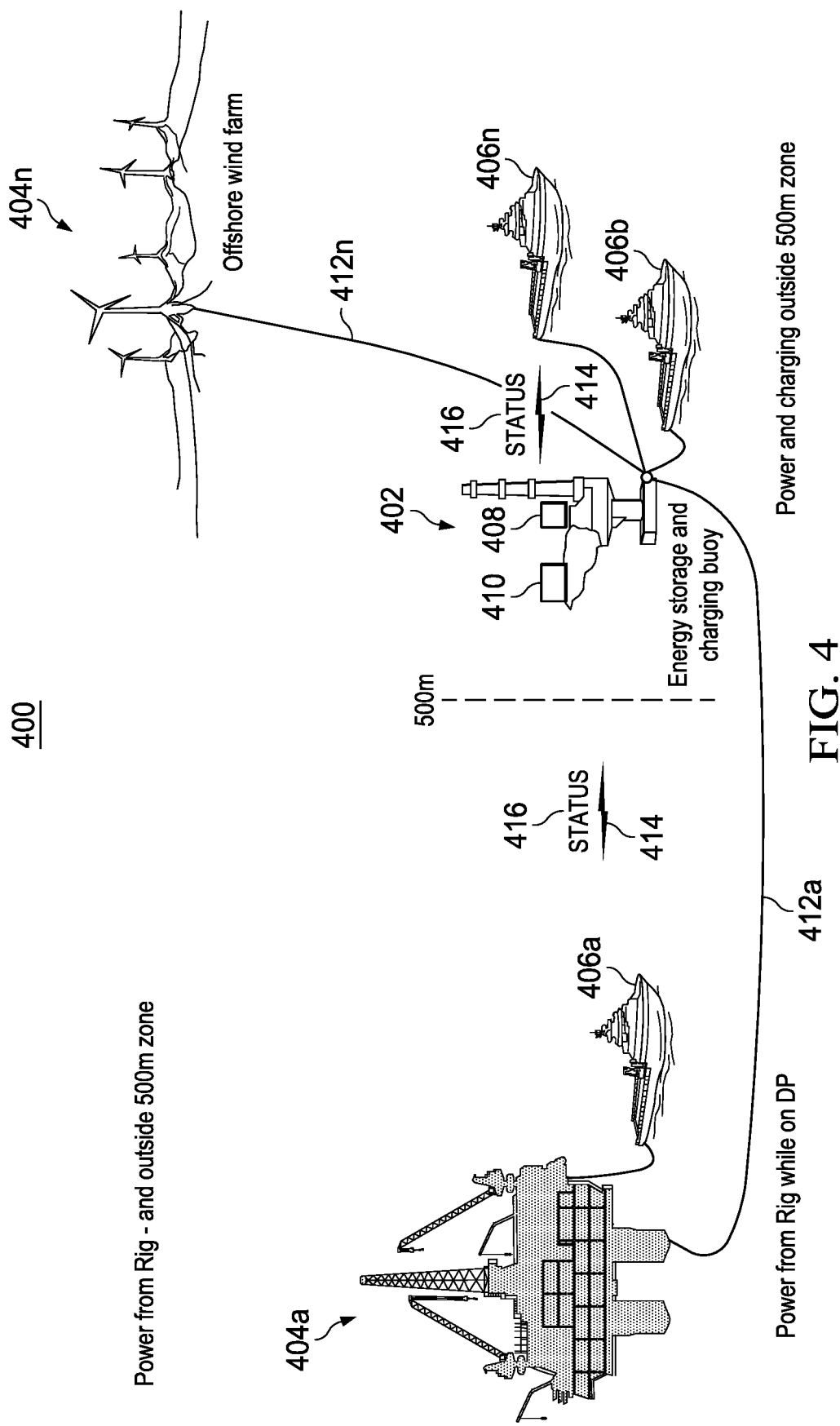
FIG. 4 is an illustration of an illustrative marine charging and/or energy storage replacement station that aggregates power from multiple energy sources.

With regard to FIG. 4, an illustration of a marine environment 400 showing an illustrative marine charging and/or energy storage replacement station 402 that aggregates power from multiple energy sources 404a-404n (collectively 404) is shown. In this case, the marine charging station 402 may be mounted to the seabed of a body of water or may be a floating marine structure or platform that may or may not be anchored to the seabed. If mounted to the seabed, the marine charging station 402 may be attached to a fixed structure or a structure that is temporarily attached to the seabed.

The marine charging station 402 may be manned or unmanned. The marine charging station may have electricity storage elements, such as batteries, that store electricity to be available to marine vessels 406a-406n (collectively 406) for recharging rechargeable batteries stored thereon. In an embodiment, the marine charging station 402 may have a power generator 408 that is configured to convert one form of energy (e.g., natural gas, solar panels) to another form of energy (e.g., electricity). In one embodiment, the marine charging station 402 may have rechargeable battery packs 410 that include rechargeable electricity storage elements capable of being moved from the marine charging station 402 onto a marine vessel 406b so that the marine vessel 406b may simply swap rechargeable battery packs rather than having to recharge while at the marine charging station 402.

As shown, there are conduits 412a-412n (collectively 412) that extend from power source 404a, in this case an offshore drilling rig, and energy source 404n, in this case a wind farm, to the marine charging station 402. The conduits 412 may be electrical conduits, such as power lines, or may be pipelines or other conduits that enable fluid, such as natural gas or other fluid, to be communicated from the offshore drilling rig or wind farm to the marine charging station 402. It should be understood that any other type of energy source system, such as geothermal, wave power, water current power, solar, underwater power station, and/or otherwise, may be utilized to generate and communicate electrical power or energy source(s) to the marine charging station 402. In an embodiment, although the marine charging station 402 is offshore, it is possible for a power source system (e.g., solar power farm) that is land-based to communicate electricity or other power source to the marine charging station 402.

If the battery packs 410 on the marine charging station 402 are configured to be swappable, the battery packs 410 may be easily disconnected from a docking system for the battery packs 410 to be recharged. It should be understood that a wide range of configurations that enable the battery packs 410 to be transferred to and from the marine charging station 402 and marine vessels 406 to be utilized. The marine charging station 402 may be configured with communications equipment that generate communication signals 414 that notify the marine vessels 406 of status 416 of charging equipment on the marine charging station 402. For example, a status indicator (e.g., flag(s), alphanumeric text, other data representative of status information) indicative that the marine charging station 402 is currently available and has available power to be delivered to a marine vessel may be communicated. In an embodiment, if the marine charging station 402 has replaceable and rechargeable batteries or battery packs 410, then the status of those battery packs 410, including availability, current charge level, size of battery, and so forth, may be communicated to the marine vessels 406 or published on a website, for example. In yet another embodiment, the marine charging station 402 may have the ability to establish a charging schedule or reservations for the marine vessels 406 to receive power, swap batteries, or otherwise, and those reservations may be made available to the marine vessels 406 via the Internet or direct communications via the communication signals 414, which may be conventional marine communications channels, such as UHF. The marine charging station 402 may utilize cranes configured to raise and lower power lines to the marine vessels, as previously shown in FIGS. 3A and 3B. In an embodiment, the marine charging station 402 may utilize a crane, lift, robotic arm, or otherwise, to enable the battery packs 410 to be lowered (or raised) to a deck or other location of a marine vessel to replace a replaceable battery pack currently on a marine vessel with a charged battery pack 410 that has been recharged by the marine charging station 402.

Figure 5A:
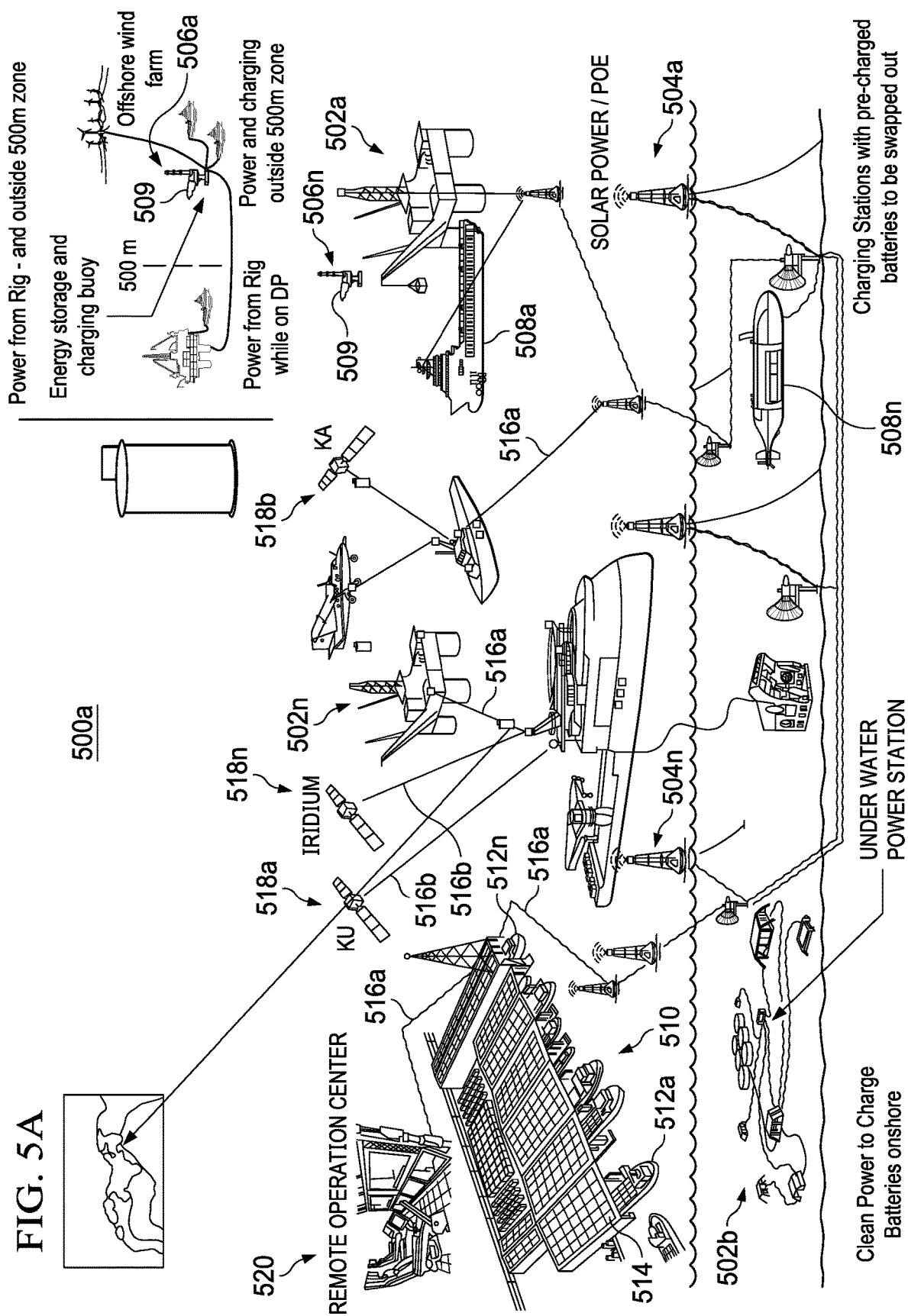
FIG. 5A is an illustration of a marine environment inclusive of multiple types of power sources, charging stations, and energy storage charging and replacement platforms for powering marine vessels.

With regard to FIG. 5A, an illustration of a marine environment 500a inclusive of multiple types of power sources 502a-502n (collectively 502), charging stations 504a-504n (collectively 504), and energy storage charging and replacement platforms 506a-506n (collectively 506) for powering marine vessels 508a-508n (collectively 508) is shown. In addition to providing for the marine platforms 506 with rechargeable and replaceable battery packs, rechargeable and replaceable battery packs 509 may be provided at onshore docking stations or piers 510 to which marine vessels 512a-512n (collectively 512) may be docked. The docking stations 510 may be configured with solar photovoltaic cells 514 to charge rechargeable batteries on the marine vessels 512. In an embodiment, the marine vessels 512 may communicate with the marine platforms 506 or onshore docking stations 510 to determine whether the docking stations 506 or 510 are available for providing recharging power and/or supplying rechargeable battery pack(s) 508, for example, that are charged (at least to a minimum threshold level, such as 70%) to the marine vessels 512. As shown, the communications may include communications channels 516a and 516b for both terrestrial and satellite communications.

The terrestrial communications channels 516a (e.g., VHF) may include wireless and wired communications channels, while the satellite communications channel 516b may include one or more wireless communications protocols and frequency bands (e.g., Ku, Ka, HF, X-Band, etc.) depending on the satellite constellation (e.g., Iridium, Starlink, etc.) of satellites 518a-518n. A remote operation center 520 may be in communications with both the terrestrial communications channel 516a and satellite communications channel 516b, and be configured to support communications with the marine vessels 508. Moreover, the remote operation center 520 may be configured to monitor operations of the charging stations 504 and platforms 506 to determine (i) current and/or real-time capabilities of availability (e.g., whether one or more vessels are currently charging batteries or replacing rechargeable battery packs, current power levels of rechargeable and replaceable battery packs, current fuel levels for fuel cells, functional status of the charging stations 504 and/or platforms 506, etc.), (ii) perform accounting functions for billing purposes in response to vessels using the recharging and/or replacing rechargeable batteries, communicating via the communications channel(s) 516a and/or 516b, (iii) monitor current weather and/or water current conditions at the charging stations 504 and/or platforms 506, or otherwise. Although not specifically shown, the remote operation center 520 may include a remote scheduling computer to be utilized to help with monitoring current status of the charging stations 504 and/or rechargeable battery packs being stored and charged by the marine platforms 506. As an example, if the rechargeable batteries are fuel cells, the amount of fuel in the fuel cells may be monitored.

The marine charging stations 504 may be coincident with buoys, communications stations or repeaters, offshore drilling rigs, or any other functional system. In an embodiment, a communications line, such as Ethernet with power over Ethernet (PoE) functionality, may be supported by the charging stations in addition to power recharging capabilities. In an embodiment, the marine charging stations 504 may be configured to identify a vessel and/or operator so that proper billing may be generated and performed. To identify the marine vessel, wired and/or wired communications signal(s) may be communicated between a marine vessel that is preparing to engage or engages with a charging station 504 or platform 506. The communications signal(s) may include a variety of information, including marine vessel identifier, vessel owner, owner account identifier, battery fuel type (e.g., rechargeable, replaceable, electric, fuel cell, fuel cell type, etc.), battery size, current account balance, previous date of recharging, arrival time, departure time, and so on. The information may be stored by the remote operation center 520, and used for billing purposes. For example, if a marine vessel recharges at a charging station for 6 hours, then the marine vessel or operator thereof may be invoiced for that much energy recharge. If a marine vessel swaps a rechargeable battery pack of a certain size and/or charge, then the marine vessel or operator thereof may be invoiced for the battery pack swap. The identification may be performed using a number of visual, wired communication, wireless communications, credit card or other credit transactions, and/or any other means by which a vessel or operator may be identified and invoiced. To account for the billing, electronic devices that record time of connect/disconnect, amount of power transfer, time of arrival/departure, and/or any other parameter may be used. The electronic devices may include sensors, communications devices to communicate sensed data, and processor(s) configured to receive, process, and store the data in a database, for example, so as to enable the generation of invoices for the operators or owners of the marine vessels.

In an embodiment, each marine vessel may be equipped with a computing system that is capable of communicating wirelessly or via a wired communication link with the charging stations 504 and platforms 506 so that transaction information may be collected and communicated to the remote operation center 520. Furthermore, energy storage devices, either fixed or replaceable and rechargeable battery packs, may also be equipped with the ability to communicate passively or actively and directly or indirectly with a computing system on the marine vessel and/or with the charging station 504 or platform 506 so that information associated with use or transfer of the energy storage devices may ultimately be captured by the remote operation center 520 (or other computing system in the cloud, for example). It should be understood that the process of capturing recharging and/or battery pack swapping data for invoicing may be performed in a variety of different ways that are fully or not fully automatic.

A marine charging station may include a marine platform positioned on a body of water. At least one energy generation source may be remotely located from the marine platform and electrically and/or fluidly coupled to an energy storage element positioned on the marine platform. At least one electrical power adapter may be available to be used to supply electrical power to a free-floating (i.e., not attached to a fixed or larger floating structure) or docked (i.e., connected via lines or otherwise to a fixed or larger floating structure) marine vessel at the marine platform to power an electricity storage element disposed thereon. The energy storage element of the marine charging station may be any form of storage element, including, but not limited to, a battery, transformer, capacitor, surge protector, and/or any other electrical device that allows for storage and/or transmission of electricity. It should be understood that a wide range of electrical components may be utilized to enable storage, regulation, and/or transmission of electrical energy to an energy storage component of a marine vessel.

As previously described, the marine platform may be mounted to the seabed of the body of water. The marine platform may be a floating marine platform. The marine charging station may further include a crane mounted to the marine platform, and a cable that (i) electrically connects to the electricity storage element and (ii) is supported and controlled in position by the crane. The marine charging station may further include (i) at least one electricity storage element disposed on the marine platform that is re-charged by the at least one energy generation source, and (ii) a docking station for the electricity storage element to enable the electricity storage element(s) to be disconnected and removed from the marine platform and placed onto a marine vessel from a docking station on the marine platform. For each of the energy storage elements, an inductive charging or other non-connector-based charging system may be used to simplify and weatherproof the energy storage elements. The energy storage elements may be configured as cassettes that can be drawn from and placed back into or onto a docking station or dock without having electrical connectors exposed to environmental conditions (e.g., rain, salt, sand, etc.). The energy storage elements, docking stations, and/or other components may be integrated with electronic monitoring devices to monitor amount of time the energy storage elements have been docked, electricity or other (e.g., fuel of a fuel cell) charge of the energy storage elements, unique identifiers of the energy storage elements, or other information that enables a vessel operator and/or automated equipment to identify which energy storage element(s) to swap to a vessel and/or vice versa. In an embodiment, the monitoring devices may communicate the date to the cloud or remote operation center 520 for maintaining and using the information during transactions and other logistics, for example.

The electricity storage element may be configured to report an amount of charge currently available using a battery charge sensor or current flow sensor to measure charge and discharge of electricity from the battery. The fluid may be natural gas or any other fluid that may be used for operating an electric generator on the marine charging stations 504. The marine platform may be a base of a wind turbine or any other structure. The electrical power adapter(s) may include an inductive element that enables a marine vessel to inductively charge a battery disposed thereon. The marine charging station may further include at least two input lines to receive electricity and/or fluid from a plurality of remotely located energy sources. The marine charging station may further include at least one energy converter system to convert a first form of energy into electricity for storage in the electricity storage element. In an embodiment, the energy converter system(s) may be configured to convert natural gas into electricity.

Figure 5B:
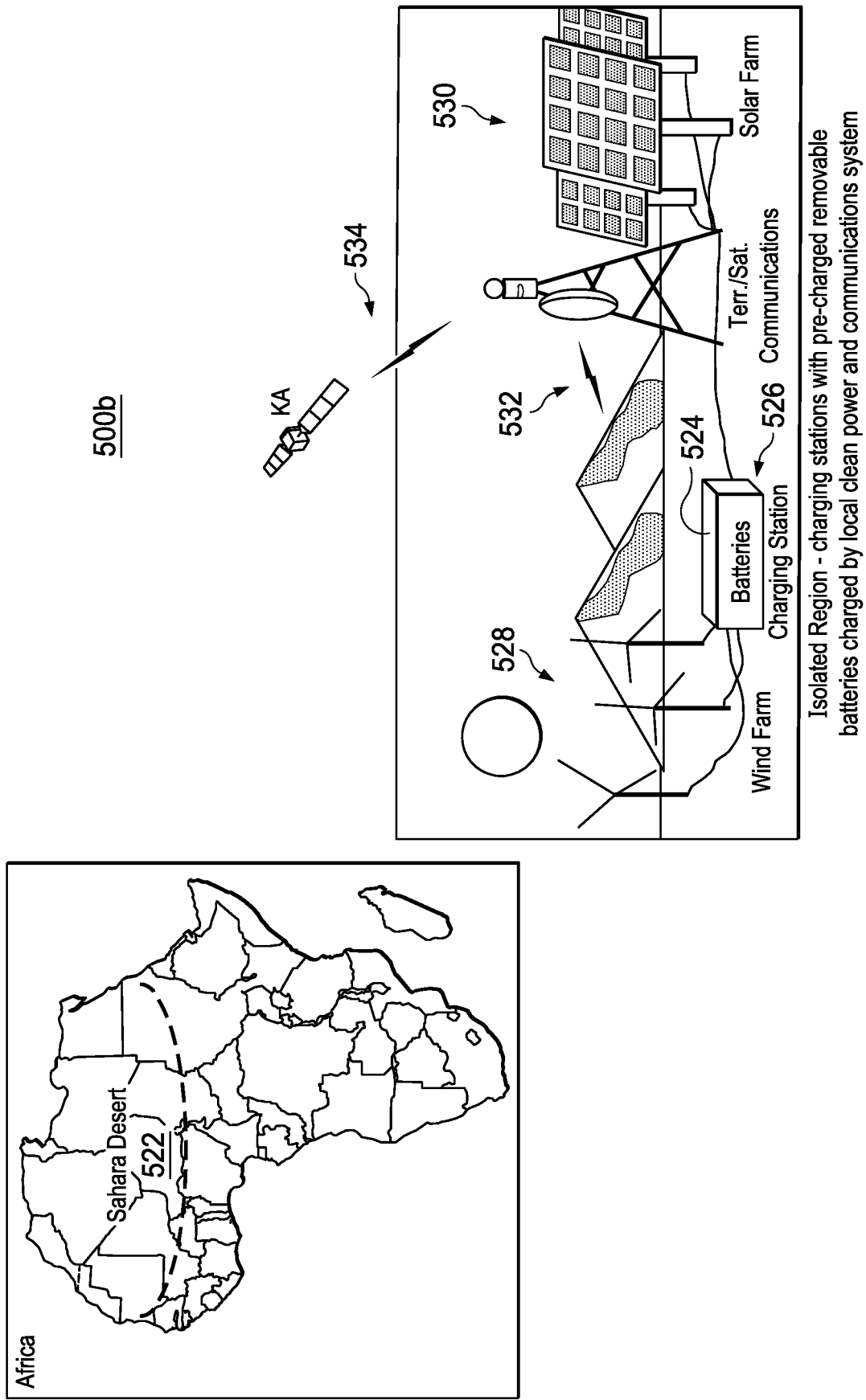
FIG. 5B is an illustration of a terrestrial environment including a land mass, such as an isolated environment in the Sahara Desert or other geographic area, in which obtaining power and communications is difficult.

With regard to FIG. 5B, an illustration of a terrestrial environment 500b, such as an isolated environment in the Sahara Desert 522 or other geographic area in which obtaining power and communications is difficult is shown. Because obtaining power from utilities in isolated environments is challenging or not possible, one system that may be provided to a local region may include local green power generation systems that uses local natural resources to create electricity. In the case of the Sahara Desert 522, local natural resources may include solar and wind energy resources. However, it should be understood that other local resources may be available and utilized. For example, if natural gas, hydrogen, or other local power sources exist, then the system may include energy conversion systems that convert those local energy natural resources. If the isolated region is in a mountainous region, then other natural resources may be tapped for providing electric energy for charging batteries 524.

The batteries 524 may be provided at a charging station 526 that is local to local power generators (e.g., wind farm 528, solar farm 530), and may be sized to power homes, vehicles, and/or any other power consumption system. The charging station 526 may, or course, enable vehicles and other systems with rechargeable batteries that utilize electric power to be recharged. In an embodiment, rather than or in addition to providing electric power at the charging station, the charging station may be capable of providing other forms of power, such as natural gas, hydrogen, or other fluids that may be used for charging fuel cells that use one or more forms of fuel. As previously described for marine applications, the batteries 524 may be configured as rechargeable and replaceable battery packs that may be charged by the charging station 526 and be capable of being easily positioned in a vehicle, home, or elsewhere to provide power to a system, such as an electrical system for powering electronics, electrical components, and/or electromechanical systems, for example. Furthermore, the battery pack may be contactless (e.g., inductive) so as to limit exposure of metallic contacts to environmental conditions.

As part of the system that may be provided in an isolated region may be a communications system. The communications system may provide both terrestrial 532 and satellite 534 communications (e.g., wired and wireless), and support any communications protocol, as understood in the art. By providing terrestrial communications 532, local residents may be able to perform traditional mobile and/or wired communications, and by providing satellite communications 534, residents at the isolated region may be able to access global communications infrastructure, such as the Internet, and communicate with anyone in any other region around the globe. As further previously described, the ability to provide a system that provides both electricity and communications allows for a major reduction of cost in terms of providing local power and communications infrastructure for isolated regions and/or developing regions in which that form of infrastructure is not current available or cost prohibitive. It should be understood that the system may be adapted to utilize specific local green energy resources.

The batteries for both marine and terrestrial purposes may be standardized in a way that small batteries have been standardized (e.g., AAA, AA, A, C, D, 9-volt standardized). The batteries for powering marine vessels, vehicles, homes, etc., of course, may be much larger. The charging stations may be adapted to handle any one or more of the rechargeable batteries and/or fuel cells such that local residents may simply exchange those size batteries that need to be recharged with recharged batteries at the charging stations. Each of the batteries and/or charging stations may have the ability to communicate information via the communications network being powered by the local power generators to a communications network (e.g., server) that local residents may monitor to determine what batteries at what charging stations are currently charged or charged to a certain level (e.g., at least 80% of capacity), thereby providing efficiency for the local residents. It should be understood that energy sources other than electrical batteries may also be made available at the charging station.

With regard to FIG. 6, a schematic diagram of a marine vessel propulsion system 600 including an electricity storage element 602, power sources 604a-604d (collectively 604), and electric propulsion system portion 606 of a marine vessel as being recharged by an external power source 608, such as a charging cable from a marine charging station, is shown. The electricity storage element 602 may be a rechargeable battery that is part of an electric storage system (ESS) 610 that may be disposed on a power bus 612. A power line that is available from a marine charging station (e.g., offshore drilling rig, marine platform, buoy, wind turbine, wave energy station, and/or any other system that operates on a body of water) may provide electric power to the ESS 610 via a second power bus or power line 614, which may be formed of a single cable that connects directly to the ESS 610 or may be connected via one or more switches to another power bus to which electric thrusters 616a-616n (collectively 616) and onboard appliances (not shown) are connected and draw power. As shown, there are five electric thrusters connected to the power bus 612. In an alternative embodiment, thrusters 616a and 616n may be diesel powered thrusters (e.g., thrusters driven by main diesel engines along a main drive shaft that may need higher power levels than electric thrusters), while the other thrusters 616b-616m may be electric thrusters capable of being driven by lower power levels, such as from the power line 614 from a marine charging station.

During recharging operations, the electric thrusters 616 are engaged to maintain a relatively fixed position of the marine vessel. Generators, which may be the diesel engines 604, may be maintained in an OFF state during recharging as the power being received to recharge the electricity storage element (e.g., battery) may be sufficient to both power the electric thrusters 616 and recharge the electricity storage element 602. In the event that the amount of power being drawn by the electric thrusters 616 and onboard appliances are higher than the amount of power being drawn from the power line 614, then one or more of the generators 604 may be transitioned to an ON state to increase electric power being supplied to either or both the electricity storage element 602 and power bus 612 to which the electric thrusters 616 and onboard appliances are electrically connected. As shown, AC/DC 618a-618n and DC/AC 620a and 620b converters are used convert the alternating current (AC) 622a from the power line 614 and generator(s) 604 to recharge the electricity storage element 602, and convert the direct current (DC) power from the electricity power element 602 to alternating current 622 for applying to the power bus 612 from which the electric thrusters 616 are connected.

Figure 7:
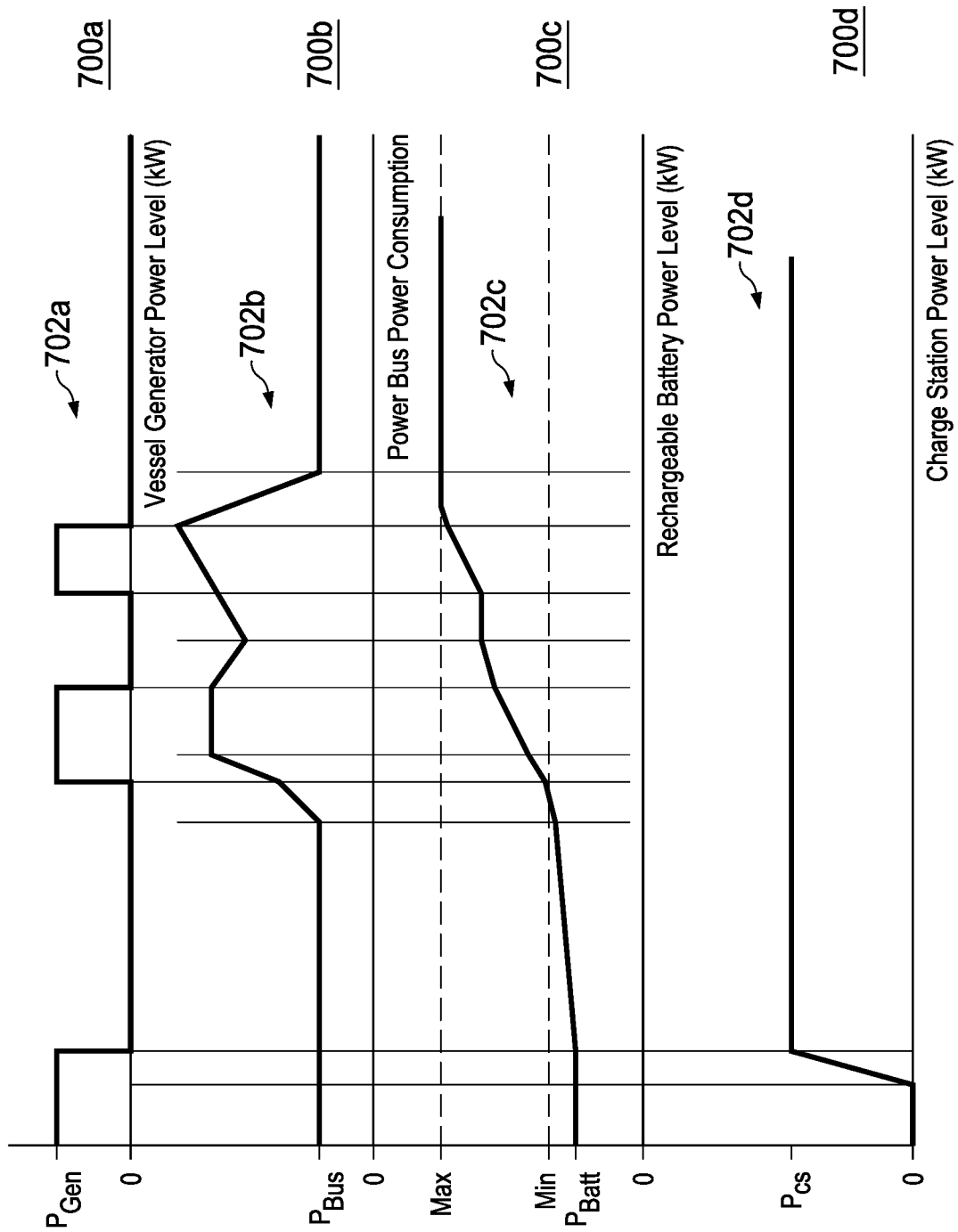
FIG. 7 is a signal diagram of signals for charging and powering the electric propulsion system of the marine vessel of FIG. 6.

With regard to FIG. 7, a set of signal diagrams 700a-700d of signals 702a-702d (collectively 702) for charging and powering the electric propulsion system of the marine vessel of FIG. 6 is shown. There are four signals 702, including a vessel generator power level signal ($P_{Gen}$) 702a, power bus power consumption signal ($P_{Bus}$) 702b, rechargeable battery power level signal ($P_{Batt}$) 702c, and charge station power signal ($P_{CS}$) 702d. As shown, the rechargeable battery power level signal 702c starts below a minimum power level, where the minimum power level may be a desired power level for the rechargeable battery power level after recharging. In response to the charge station power being applied to the power bus of the vessel to charge the rechargeable battery and power the electric thrusters and appliances electrically connected to the power bus, the rechargeable battery power level signal 702c begins to increase, and the vessel generator may be turned OFF if the charge station power, as illustrated by the charge station power level signal 702d is determined to be sufficient to recharge the rechargeable battery along with supporting the electric thrusters and appliances connected to the power bus of the marine vessel.

As the power bus power consumption signal 702b (i.e., electricity drawn by the electric thrusters and appliances) increases, the recharging of the rechargeable battery slows, as shown by the rechargeable battery power level signal 702c. At a certain point, as the power consumption increases even more, a power control system, such as the electric storage system (ESS), may determine that additional power supply is needed and a power activation signal (not shown) may be generated to cause the vessel generator or power generator to transition to an ON state, as shown by the vessel generator power level signal 702a turning ON, where a $P_{Gen}$ power signal level is provided by the vessel generator to the ESS for recharging the battery and/or providing additional power to support the appliances and electric thrusters. As shown, in response to the vessel generator turning ON, the rechargeable battery power level signal 702c increases because there is sufficient power to now supply both the load (i.e., electric thrusters and appliances) on the power bus of the vessel along with supplying power to the rechargeable battery for recharging. As the load on the power bus decreases, then the vessel generator may again be transitioned to an OFF state, as shown by the vessel generator power level signal 702a. In response to the load on the power bus again increasing, possibly due to more power needed by the electric thrusters, the vessel generator is again cycled to an ON state, as shown by the vessel generator power level signal 702a. Once the rechargeable battery voltage level signal 702c reaches a maximum charge and the load on the power bus decreases, the vessel generator may be turned to an OFF state again, as shown by the vessel generator power level signal 702a. It should be understood that the charge station $P_{CS}$ 700d and vessel generator $P_{Gen}$ 700a signals are AC signals on an AC grid or power bus, but shown as average signals for illustration purposes.

Figure 8:
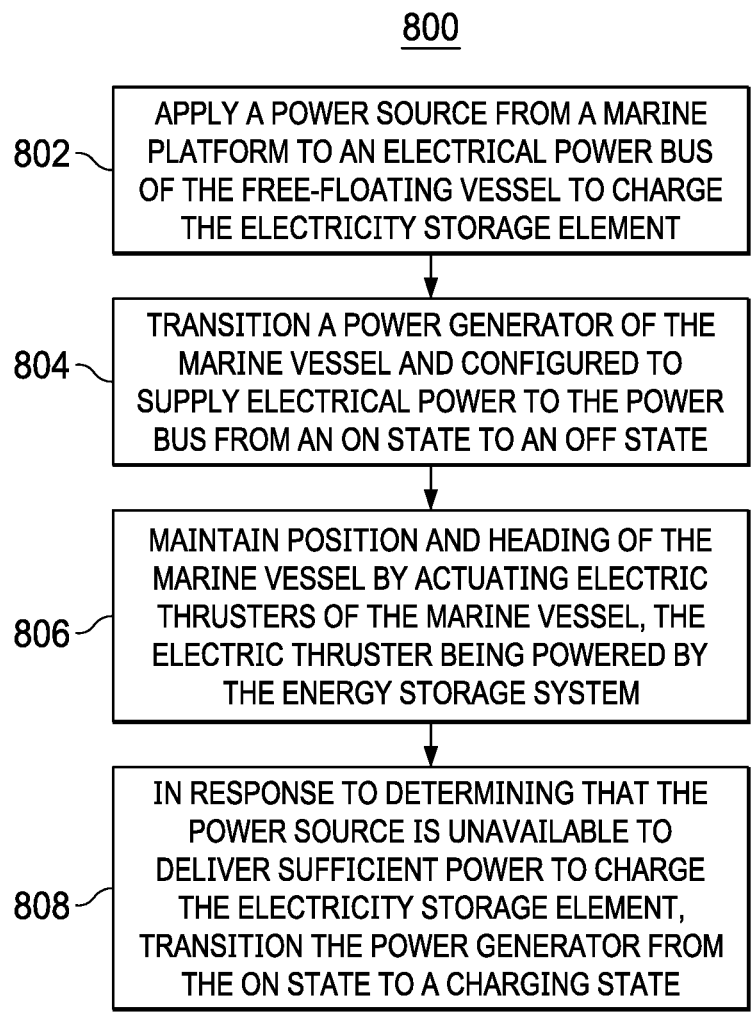
FIG. 8 is a flow diagram of an illustrative process for charging an electricity storage element of a marine vessel.

With regard to FIG. 8, a flow diagram of an illustrative process 800 for charging of an electricity storage element of a marine vessel is shown. The process 800 may start at step 802 by applying a power source from a marine platform or charging station to an electrical power bus of the free-floating (or non-free-floating) vessel to charge the electricity storage element. At step 804, a power generator of the marine vessel configured to supply electrical power to the power bus may be transitioned from an ON state to an OFF state. The power generator may be a diesel engine, for example, or any other generator operating on the marine vessel. The marine vessel may be maintained in position and heading by actuating electric thrusters of the marine vessel at step 806. The electric thrusters may be powered by the energy storage system and/or the electricity being delivered by the power line from the marine charging station. At step 808, in response to determining that the power source is unable to deliver sufficient power to charge the electricity storage element, the power generator may be transitioned from the OFF state to a charging state. The charging state may be an ON state at a partial or full operational state. In determining that the power source is unable to deliver sufficient power to charge the electricity storage element, a determination may be made that the power being drawn the by the electric thrusters and/or other electrical components on a power bus exceeds a threshold that causes the electricity storage element to be drained or to be increased in electricity storage to be insufficient for charging purposes (e.g., less than 500 W per hour). In an embodiment, the determination may be made over a time period.

In an embodiment, applying a power source from a marine platform include supplying a power source via a flexible cable. Furthermore, applying a power source via a flexible cable includes applying a power source via a flexible cable operated by a crane on the marine platform.

Maintaining position and heading may include (i) sensing position and heading of the marine vessel, and (ii) applying control signals to the electric thrusters to cause one or more of the electric thrusters to transition from a first state to a second state to maintain position of the marine vessel relative to the marine platform.

Applying a power source from a marine platform may include applying the power source from an offshore oil rig. Determining that the power source is unable to deliver sufficient power to charge the electricity storage element may include (i) monitoring power level of the electricity storage element, (ii) monitoring power load being drawn from the power bus, and (iii) in response to determining that the power load of the electric thrusters is above a threshold based on an amount of power being received from the power source and electricity charge of the electricity storage element, a power activation signal may be generated to cause the power generator to transition from an OFF state to an ON state.

The process 800 may further include operating the power generator when in the charging station at a power level less than a power level used to propel the marine vessel during operation when in the ON state. In an embodiment, operating the power generator in a charging state may include operating the power generator at a frequency below 60 Hz. Maintaining position and heading may include maintaining position in heading relative to the marine platform. Maintaining relative position and heading may include maintaining a relatively fixed position and heading relative to a floating marine platform.

Figure 9:
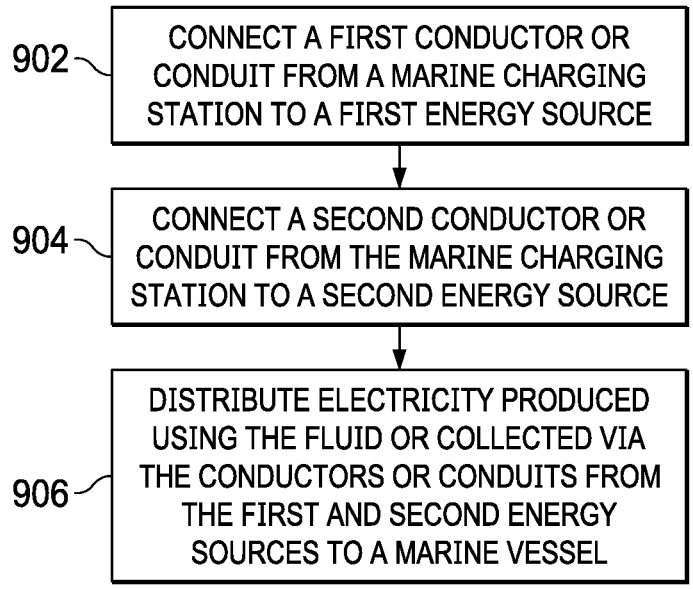
FIG. 9 is a flow diagram of an illustrative process for providing energy at a marine charging station.

With regard to FIG. 9, a flow diagram of an illustrative process 900 for providing energy at a marine charging station. The process 900 may start at step 902 by connecting a first conductor or conduit from a marine charging station to a first energy source. At step 904, a second conductor or conduit may be connected from the marine charging station to a second energy source. The conductor may be an electrical conductor and the conduits may be configured to transport oil, natural gas, geothermal energy, or other fluid that may be converted into electricity. At step 906, electricity produced from the fluid or received from the conductors and/or conduits from the first and second energy sources may be distributed to a marine vessel. In an embodiment, a natural gas generator may be used to produce electricity from natural gas received from one or more energy sources. In another embodiment, electricity may be received from one or more energy sources (e.g., from a generator on an oil rig), and the electricity may be stored in a battery or battery packs at the marine charging station.

Figure 10:
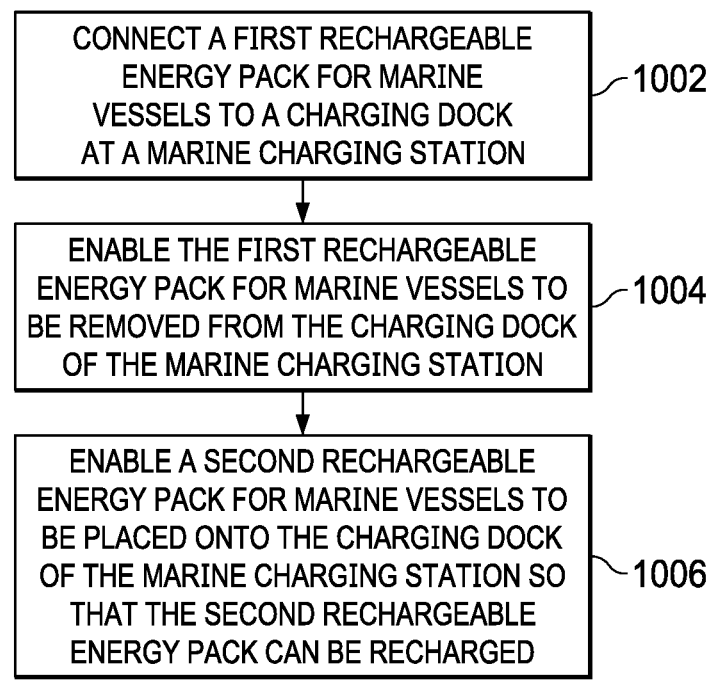
FIG. 10 is a flow diagram of an illustrative process for providing a rechargeable energy pack for marine vessels to a charging dock at a marine charging station.

With regard to FIG. 10, a flow diagram of an illustrative process 1000 for providing a rechargeable energy pack for marine vessels at a marine charging station is shown. The process 1000 may start at step 1002 by connecting a first rechargeable energy pack for marine vessels to a charging dock at a marine charging station. At step 1004, the first rechargeable energy pack for marine vessels may be enabled to be removed from the charging dock of the marine charging station. At step 1006, a second rechargeable energy pack for marine vessels may be enabled to be placed onto the charging dock of the marine charging station so that the second rechargeable energy pack can be recharged. Enabling removing and replacing (or swapping) of the first and second energy storage packs may be performed by providing a mechanism, such as one or more cranes, on the marine charging station to hoist and move each of the rechargeable energy packs. In an embodiment, an automated process for swapping the first and the second rechargeable energy packs may be performed, where the automated process may include a robotic arm or other mechanical (e.g., winch, lift, rail, etc.), electromechanical, hydromechanical, or pneumatic structure, for example, to move each of the rechargeable energy packs. The rechargeable energy packs may be batteries, fuel cells, fluid containment devices, or otherwise.

Figure 11:
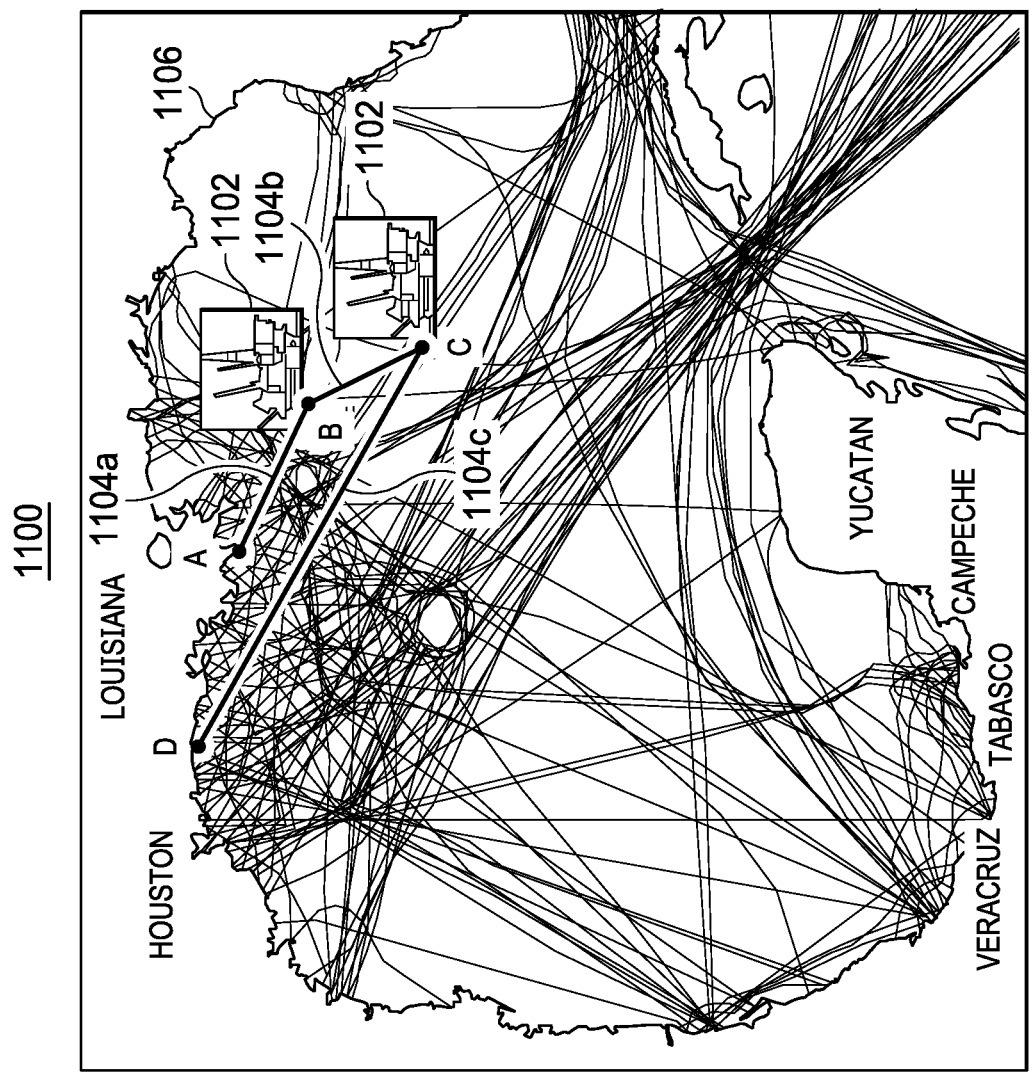
FIG. 11 is an illustration of a marine vessel and travel path thereof in performing efficient power usage to minimize energy consumption and emissions.

With regard to FIG. 11, an illustration of an environment 1100 including a marine vessel 1102 and travel path 1104a-1104c thereof on a body of water 1106 and performing efficient power usage to minimize energy consumption and emissions is shown. Historically, marine vessels have traveled between origin and destination points, and when at the destination points, "park" the marine vessels at the destination points until operations are ready for the marine vessel. This parking at the leads to fuel consumption and emissions. In other cases, notice is given to the vessel operator to arrive at a destination point that causes the operator to travel faster than desirable such that additional fuel is consumed along the way and stressing the propulsion system.

To avoid extra fuel consumption by having to wait for a vessel to be engaged at the destination point or having to travel too fast, an estimated time of arrival system may be utilized to factor in many different parameters, including environmental conditions, distance, most efficient engine speed, and so on. The various parameters may be optimized by a navigation system so that a marine vessel may set an arrival time and compute a proper time of departure such that the propulsion system can operate at speeds that are most fuel efficient. In some embodiments, depending on the configuration of the marine vessel, it may be possible to compute and utilize electric power for some or an entirety of the trip. As shown in FIG. 11, the marine vessel 1102 may start at point A, arrive at point B, then travel to point C, and travel back to point D for collecting and delivering oil. As an example, the trip between points B and C may utilize, at least in part, electric powered propulsion over diesel or smaller diesel engines if the environmental conditions (e.g., wind and water current) are calm. Using a number of different factors, a reduction in fuel consumption and emissions can be achieved without disrupting or reducing operations by performing planning that includes vessel parameters, environmental factors, and/or other parameters.

Figure 12A:
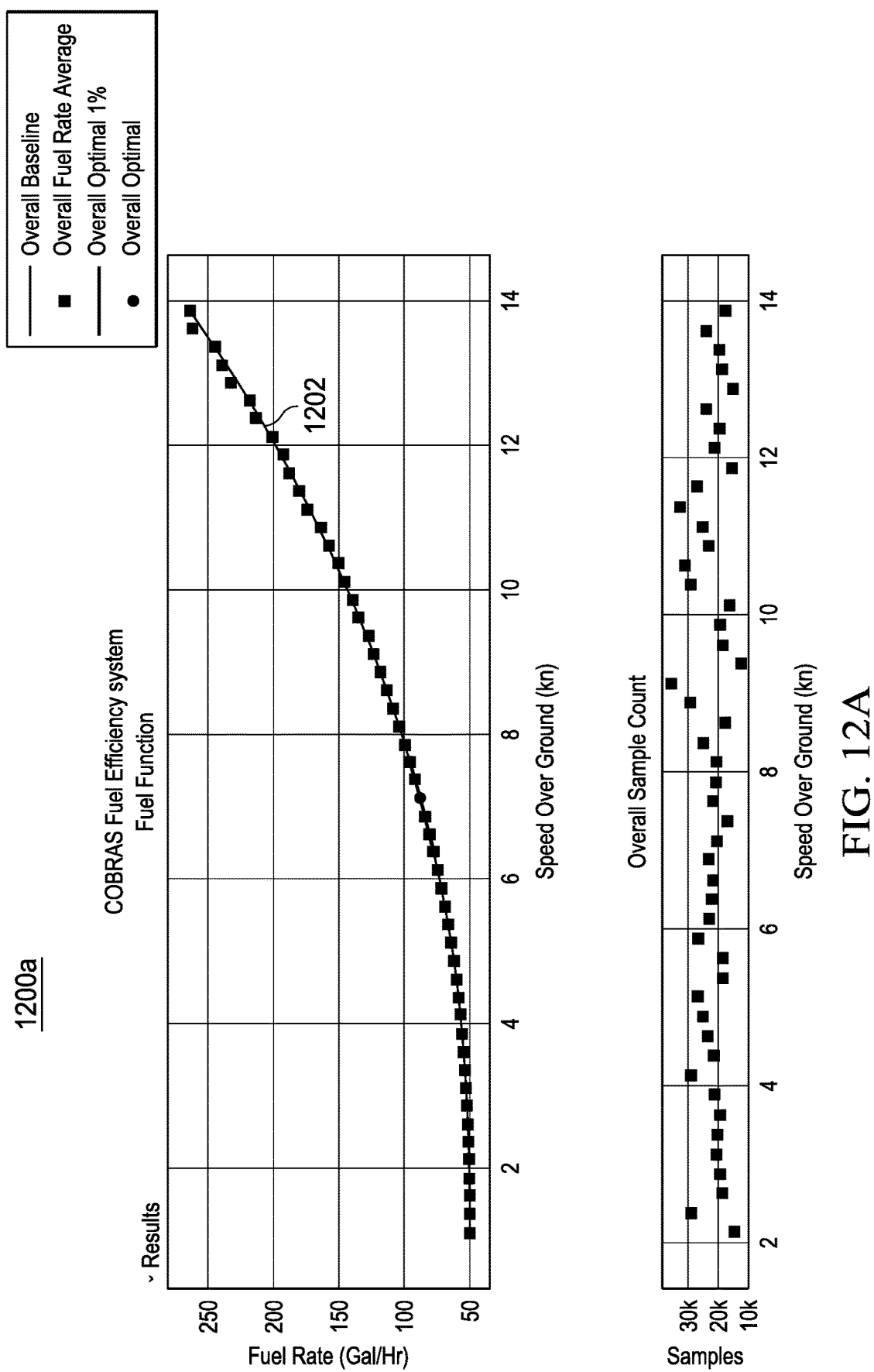
Figure 12B:
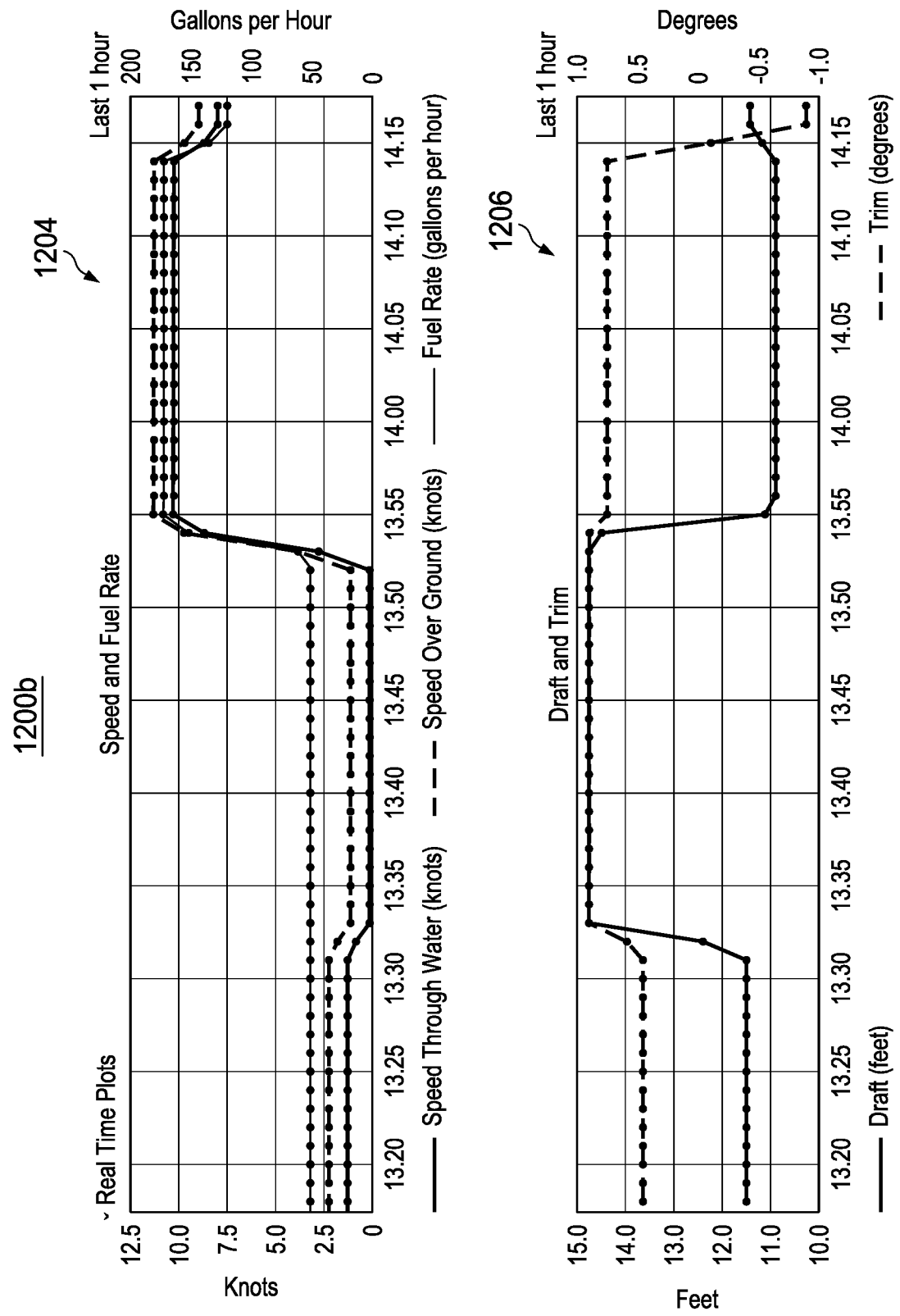

With regard to FIGS. 12A and 12B, signal diagrams 1200a and 1200b used by operators of marine vessels for minimizing energy consumption and emissions is shown. FIG. 12A provides for a fuel efficiency curve 1202 based on fuel rate (Gal/hr) versus speed over ground (knots). An ideal operating level is shown such that the most optimal speed versus fuel rate is provided at around 7 knots. As such, any trips that use this particular marine vessel should plan for travel at 7 knots when traveling between origination and destination points. From that speed, a proper trip can be planned by determining a time of arrival and calculating a starting time, thereby optimizing fuel efficiency. As provided in FIG. 12B, speed and fuel rate graphs 1204 are shown as a function of speed (knots) and fuel rate (gal/hr). Below that graph are draft and trim plots 1206 of the marine vessel. Using these and other parameters, a system may continue to monitor the marine vessel to optimize these operating parameters such that an optimized fuel consumption may be used during the trip.

As an example, speed recommendations and estimated time-of-arrival (ETA) may be planned and presented to a vessel operator, as provided in FIGS. 12C and 12D. The recommendations may be performed as part of an overall monitoring system to continuously monitor many different aspects of a marine vessel. Fuel savings and carbon emissions may be shown to a marine vessel operator or used in computing operating parameters, including whether to change operations of the propulsion system or any other aspects of the marine vessel to optimize the fuel consumption and/or emissions of the marine vessel during a voyage between points of origin and destination. It should be understood that if the marine vessel is operating in an automated manner, manned or unmanned, then the recommendations and planning shown in FIGS. 12C and 12D may be used to compute new operating parameters to optimize for fuel efficiency and minimal emissions.

Conditional Based Monitoring

Figure 13:
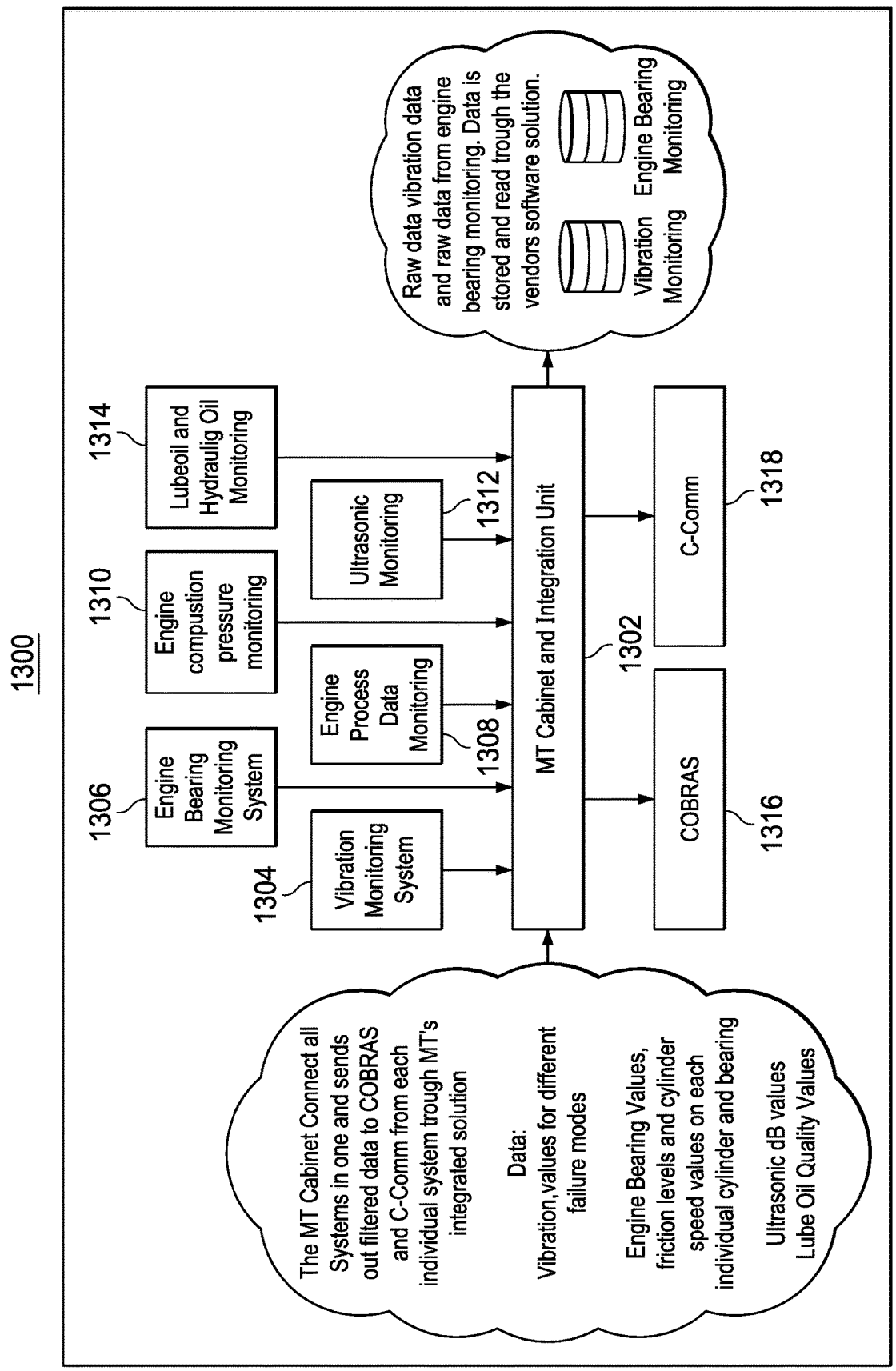
FIG. 13 is a block diagram of an illustrative system that may be used to monitor operations of a marine vessel and equipment operating thereon so that recommendations to vessel operators may be made to improve operations and minimize failure of equipment and vessels may occur.

With regard to FIG. 13, a block diagram of an illustrative system 1300 that may be used to monitor operations of a marine vessel and equipment operating thereon so that recommendations to vessel operators may be made to improve operations and minimize failure of equipment and vessels may occur is shown. The use of remote monitoring and control may also be used to manage a fleet of vessels for various parameters, such as fuel efficiency and reduced emissions.

An integrated monitoring system 1302 may be integrated into a propulsion system of a marine vessel. In an embodiment, an electronics system that may function as an integration unit that may be disposed in a cabinet or other location (e.g., integrated into an onboard navigation system of a marine vessel. The monitoring system may be in communication with a vibration monitoring system 1304, engine bearing monitoring system 1306, engine process data monitoring system 1308, engine combustion pressure monitoring system 1310, ultrasonic monitoring system 1312, and lube oil and hydraulic oil monitoring system 1314. Each of the systems 1304-1314 may utilize sensors to sense operation of each of the various components of a marine vessel propulsion system. Data from each of the monitoring systems may be communicated to the integrated monitoring system 1302, which may store the raw data for processing thereby and/or for routing the data to another system, such as a machine-learning system 1316 that helps detect potential inefficiency or failure conditions prior occurrence of an incidence, as further described hereinbelow. The integrated monitoring system 1302 may be in communication with a communications system 1318 to communicate data, raw and/or processed, to a remote operation center (see FIG. 5, for example) for processing or monitoring thereby.

The system may be configured to detect dependencies beyond problems and limits of a single vessel or across all the monitoring points on the vessel or fleet. In an embodiment, machine groups and equipment may be compared across the fleet so that each type of vessel or each vessel may be compared against other types of vessels or other vessels.

Single measurement points, values, averages dependencies and failure modes may be monitored and used for assessing performance so as to reduce fuel consumption and emissions. That is, vessel groups and equipment may be compared across the fleet of vessels. Multiple points, averages and values, dependencies and failure modes may also be compared, thereby providing for additional knowledge using machine-learning or other algorithms about a single vessel or multiple vessels. Still yet, travel paths may be monitored so that improved travel paths that are more efficient may be generated, thereby reducing fuel consumption and emissions. The inclusion of communications equipment on the marine vessel may enable data from each marine vessel to a centralized control and monitoring system may be performed, thereby allowing for additional or management processing to occur and be part of the process to improve efficiency of marine vessels.

In an embodiment, a dashboard for key performing indicators (KPI) may be created. That is, KPI monitoring, reporting, alarms, and manual feedback may be provided for an operator of individual vessels up to an entire vessel fleet. The dashboard may be adjusted for each individual purpose and function.

The system may be configured to request specific reports, KPIs and cross checks between values, failure modes, averages and dependencies for vessels across the fleet. The management system may be configured to store and learn from what requests have been made and granted or rejected, thereby allowing the system to learn and provide recommendations to other vessel operators who have the same or similar issues.

In an embodiment, a Class CM notation based on vessel groups and types may be utilized. The system may consider the same vessel groups across the fleet, identify weak points, and enable the operator to proactively work to improve the weak point and avoid single failure on different vessels. For example, equipment that is common to different vessels may be tracked so as to learn how each piece of equipment operates and fails, so that the system may identify problems that are to potentially occur and provide guidance, warnings, or alarms to the operators of the vessels, thereby reducing failure times, improve operating efficiency, and/or otherwise.

A Class CM notation based on machine specifics may be utilized. Analysis and reporting are conventionally manually performed by certified engineers and companies. The system should be able to reduce the manpower needed by automatically tracking equipment on each vessel.

A CM notification on diesel engines may be utilized. The system with plugins or sensors for engine monitoring should enable the system to monitor the diesel or other engines of propulsions systems, thereby enabling monitoring and improving efficiency of operation of each vessel.

The previous description is of at least one embodiment for implementing the invention, and the scope of the invention should not necessarily be limited by this description. The scope of the present invention is instead defined by the following claims.

What is claimed is:

1. A method for charging an electricity storage element of an energy storage system of a stationary, free-floating marine vessel, said method comprising:

applying a power source from a marine platform to an electrical power bus of the free-floating vessel to charge the electricity storage element;

transitioning a power generator of the stationary, free-floating marine vessel and configured to supply electrical power to the power bus from an ON state to an OFF state;

maintaining position and heading of the marine vessel by actuating electric thrusters of the marine vessel to cause the marine vessel to be maintained in the stationary position relative to the marine platform, the electric thrusters being powered by the energy storage system of the marine vessel; and in response to determining that the power source is unable to deliver sufficient power to charge the electricity storage element, transitioning the power generator of the marine vessel from the OFF state to a charging state.

2. The method according to claim 1, wherein applying a power source from a marine platform include supplying a power source via a flexible cable.

3. The method according to claim 2, wherein applying a power source via a flexible cable includes applying a power source via a flexible cable operated by a crane on the marine platform.

4. The method according to claim 1, wherein maintaining position and heading includes:

sensing position and heading of the marine vessel; and applying control signals to the electric thrusters to cause one or more of the electric thrusters to transition from a first state to a second state to maintain the stationary position of the marine vessel relative to the marine platform.

5. The method according to claim 1, wherein applying a power source from a marine platform includes applying the power source from an offshore oil rig.

6. The method according to claim 1, wherein determining that the power source is unable to deliver sufficient power to charge the electricity storage element includes:

monitoring power level of the electricity storage element;

monitoring power load being drawn from the power bus; and in response to determining that the power load of the electric thrusters is above a threshold based on an amount of power being received from the power source and electricity charge of the electricity storage element, generating a power activation signal to cause the power generator of the marine vessel to transition from an OFF state to an ON state.

7. The method according to claim 1, further comprising operating the power generator when in the charging station at a power level less than a power level used to propel the marine vessel during operation when in the ON state.

8. The method according to claim 7, wherein operating the power generator in a charging state includes operating the power generator at a frequency below 60 Hz.

9. The method according to claim 1, wherein maintaining position and heading includes maintaining position in heading relative to the marine platform.

10. The method according to claim 9, wherein maintaining relative position and heading includes maintaining relative position and heading from a floating marine platform.

* * * * *